2,846,431

WATER SOLUBLE THERMO-SETTING RESIN AND METHOD FOR ITS MANUFACTURE

Worth C. Goss, Seattle, Wash., assignor, by mesne assignments, to Permanente Cement Company, Oakland, Calif., a corporation of California No Drawing. Application October 1, 1951
Serial No. 249,207

4 Claims. (Cl. 260—124)

This invention relates to a novel, relatively inexpensive, thermo-setting plastic substance and to a practical method for its production, and has for its principal object to provide such a substance that is useful as a glue or bonding agent in the manufacture of compressed fiber products such as fiber boards and sheet lumber; that will increase wet strength of such products; that is further useful as a strengthening and water proofing agent in the manufacture of paper and cardboard products, and in the manufacture of various laminated, woven or fibrous products where such a glue or bonding agent is desirable.

It is also an object of the invention to produce such a thermo-setting plastic substance from waste sulphite liquor of the paper pulp industry.

More specifically stated, the primary object of this invention is to produce, from a sulphite pulp liquor, a thermo-setting plastic substance which prior to setting becomes freely fluid under the influence of heat, pressure and moisture and is highly adhesive, and when used as a bonding agent in the manufacture of compressed fiber products, and caused to set under the action of heat and pressure, will give exceptional strength and will increase the wet strength of the resultant product, and decrease its absorption of water when immersed therein.

Another object of the invention is to produce a resinous plastic material from a sulphite pulp liquor, which can be dissolved, particularly in water of alkaline pH value, and when dissolved is suitable for impregnating such fibrous materials as paper, cardboard as used for box or carton manufacture, "soft board" and cloth materials for various uses, to give strength and water resistance thereto.

Another object of this invention is to produce from a sulphite pulp liquor, a plastic having the above stated characteristics, that can be dried, powdered and safely stored, and which is chemically stable.

Yet another object of the invention is to subject the waste liquor from sulphite pulp mills to a processing, the effluent from which is non-toxic to fish.

As one example of the process of manufacture of the present plastic material, I give the following: calcium base waste sulphite liquor, containing from 10% to 12% solids, was steamed at a pressure of 100 pounds per square inch and excess sulphur dioxide was thus stripped or driven therefrom until the liquor showed a change of pH from a normal of about 2.4 to a pH falling within a range of from 4.5 to 4.7. To the stripped liquor, from which the sulphur dioxide had thus been removed, ammonia then was added in the amount of one pound of dry anhydrous ammonia to each twenty-five liters of sulphite liquor. The proportionate amount to be used, however, is not critical and can be substantially more or less. At the time the ammonia was added, the liquor was heated to about 300° F., or approximately seventy-five pounds per square inch of saturated steam pressure. During this heating period, and thereafter for a certain satisfactory period of time, for example, for about one hour, air was caused to be bubbled or otherwise passed in substantial amount through the liquid to cause it to be oxidized, during which time it was maintained under a pressure of approximately 150 to 200 pounds per square inch and an approximate temperature of 300° F. At the end of one hour, the ammonia was distilled from the oxidized liquor, reducing the pH to approximately 8.0; the major portion of ammonia being recovered.

After the above treatment, the liquor was very carefully filtered for the removal therefrom of such substances as calcium sulphate, calcium sulphite and residual traces of woody substances from the pulping process.

Following this careful filtration, and preferably after an actual clarification of the liquor with a high speed centrifuge, the liquor was neutralized and acidified, with hydrochloric acid, to a pH of about 1.7. Such neutralization and acidification preferably is carried out near the boiling point of water, at which temperature the precipitate is considerably densified and thus more easily filtered. The filtered precipitate was then fully washed in clear water at a pH of about 7 until the wash water showed a pH of over 6, after which the precipitate was neutralized with ammonia, then dried and powdered and retained for use.

Alternatively, instead of acidifying the clarified, oxidized resin solution, the resin may be purified by dialysis with pure clear water. This leaves the resin in ammonia solution and ready for impregnation uses. This procedure has the advantage that no acid is required. Dialysis may be accomplished through parchment paper or other suitable membrane. Whether the resin is purified by precipitation with acid or by dialysis, advantages in economy may be obtained by concentration of the liquor either before or after oxidation.

One manner of use of the material consists in dissolving it in a suitable solvent such as ammoniated water for use as an impregnating solution.

The resin, as thus produced, is primarily an insoluble material in water at a pH of less than 6, but will dissolve in water at a pH of over 7 when in the presence of such agents as ammonia, potassium hydroxide, or sodium hydroxide.

By the foregoing treatment, the pulp liquor, after having been oxidized in the presence of ammonia may be separated into two principal fractions; one fraction thereof, which precipitated at a reduced pH, constitutes the plastic, or plastic glue or bonding agent of this invention. The other fraction, which is the filtrate, and which remains liquid at an acid pH, contains sulphur, nitrogen and calcium. When this fraction is neutralized to a pH of 7 with ammonia or calcium hydroxide, it becomes valuable for making fertilizing materials. For example, it can be concentrated, dried and powdered and used as a dry fertilizer.

If dialysis is employed as the method of purification, the resin remains in solution and is ready for use with or without further concentration. The fraction carried away with the water stream consists in sundry organic and inorganic materials which may be concentrated and used as fertilizer. If not so used, these residual materials, after neutralization with lime if necessary, can be discharged into large bodies of water without harm to any fish life therein. The non-toxic properties of these materials derive particularly from the fact that they have been subjected to oxidation, as described, and therefor do not absorb the oxygen naturally present in solution in the water.

The plastic or glue of the present invention can be put to many and various uses, the principal uses, however, being those of a glue and/or a strengthening and/or a water proofing agent in the making or treating of products where the bonding and coalescing of parts, fibers or particles is required. This plastic glue is capable of reacting with formaldehyde to set to an insoluble, waterproof resin. At the higher temperatures, that is about 400° F., the substance is self setting, i. e. sets without addition of formaldehyde. The plastic glue, when mixed with certain types of wood fibers, protected by use of buffering agents as described in my co-pending application filed on December 22, 1949, under Serial No. 134,605 is capable of setting to an infusible, insoluble material to produce boards of superior quality. The said application Serial No. 134,605 has been abandoned and replaced by my copending application Serial No. 387,036, filed October 19, 1953, now abandoned.

In view of the unusual characteristic of the present material, as above recited, it is very effective and useful for fiber board manufacture, and is especially desirable in the making of sheet lumber in accordance with the process taught in my U. S. Patent No. 2,480,851, issued on September 6, 1949. This is due to easy meltability of the plastic of this invention.

In order to utilize the present dried and powdered plastic for the impregnating of paper, cardboard, corrugated cardboard as used extensively in the making of cartons and boxes, and various other materials, it is first dissolved with from 3% to 5% of formaldehyde, based on the dry weight of the resin, and then impregnated into the paper or cardboard or embodied with the pulp during paper manufacture, and the paper subsequently baked at temperatures ranging over 100° C. This baking results in a material increase in strength of the paper or cardboard and, at the same time renders the material comparatively water resistant. The wet strength of the material oftentimes shows an increase of from 500 to 600%.

When the two outside liners of the corrugated board used to make cardboard boxes are impregnated with this resin to which a small amount of formaldehyde has been added, and the material suitably baked, the bursting strength of the corrugated board is very materially increased.

In order to permit liners so impregnated to be used in standard machinery for producing corrugated board it is necessary to leave unchanged that surface of each liner which is to be glued (usually by means of a starch-base glue) to the inner corrugated web. For this reason, such liners should be impregnated with the resin solution described from one side only and then only to an extent which leaves the opposite sides of the liner unshiny after drying. Alternatively, if the resin is embodied in the paper during its manufacture, this can most suitably be done for the present purpose in a papermaking machine of the type which builds up the paper from a number of layers of paper stock. In such a case the resin solution should be left out of the stock chest or chests from which the outer one or two plies on one side are produced.

This resin also is capable of being dissolved in acetone and water and may be used at an acid pH. This would probably have considerable usage for non-cellulosic material but in general, for cellulosic bodies, the resin should be used at an alkaline pH, preferably made alkaline with ammonia or some similar organic type base such as quaternary bases or other organics. When used with cellulosic materials, a buffering agent such as ammonia, urea, dicyandiamide, guanidine or other buffering substances such as an amine is preferably employed therewith.

The purpose of the buffering agent is to permit the impregnated article to be baked at a comparatively high temperature to obtain full setting of the resin without burning or causing deterioration of the cellulosic fibers. This prevents loss of strength in the board or paper.

The process as outlined above, consisting of treating of calcium sulphite pulp liquor with ammonia and air or oxygen, then distilling off the ammonia and acidifying the body of the pulp liquor to precipitate the thermo-setting resin is quite an efficient process, as a large percentage of the ammonia can be reclaimed, and the portion which is not reclaimed either enters into the resin or into the fertilizer by-product of the process.

This same process of treating waste sulphite pulp liquor can be followed for the making of soluble resin from various other sulphite pulp liquors including sodium sulphite, ammonia sulphite, potassium sulphite or magnesium sulphite. The process when sodium hydroxide is used instead of ammonia also is suitable for the making of soluble resin from almost any woody substance such as brown rotted wood, and decayed vegetable matter.

The plastic glue of this invention will set at a temperature of about 400° F. Its uses are various and many, covering in particular the bonding and water proofing of compressed fiber products. Primarily, it can be considered as an industrial binder and is used in the conventional way as such. Also, it can be embodied in an aqueous suspension of pulp, or wood fibers to effect thorough impregnations of paper, or it can be dissolved in various solvents and applied as a penetrating liquid to surfaces of fibrous bodies to give water resistance and strength thereto.

In the following claims, the term "purifying the resin" means either acidifying the oxidized solution thus precipitating the resin followed by thorough washing of the precipitate; or, dialyzing the pulp liquor impurities away from the resin solution. These impurities are principally amino acids which need not be completely removed by dialysis to make the resin effective.

Having thus described my invention, what I claim as new therein and desire to secure by Letters Patent is:

1. The process of making a thermo-setting plastic of the character described from a sulphite pulp liquor, comprising subjecting the liquor to heat and steam pressure to effect stripping of free sulphur dioxide therefrom, adding ammonia to the liquor after the stripping of the sulphur dioxide therefrom, and while the liquor is maintained substantially at a temperature of about 300° F. and under pressure, subjecting it to oxidation by passing air therethrough, distilling off the ammonia until the pH is reduced to approximately 8, filtering the liquor, and acidifying the clarified liquor to precipitate and recover therefrom a thermo-setting resin.

2. The process of making a thermo-setting plastic from waste pulp liquor comprising, subjecting the liquor to steaming at a pressure of about 100 pounds per square inch and driving excess sulphur dioxide therefrom until it shows a pH of about 4.5, adding to the liquor from one half pound to four pounds of dry anhydrous ammonia for each 25 litres of liquor, maintaining the liquor at a temperature of about 300° F., and causing air to be bubbled therethrough for a period of about one hour while it is maintained at a pressure of from 100 to 200 pounds per square inch, distilling ammonia from the oxidized liquor until it has a pH of approximately 7 to 10, filtering the liquor to remove insoluble non-resinous materials, and acidifying the clarified liquor to a pH of about 1.7 to precipitate a self-setting resin, and recovering the resin from the acidified liquor.

3. A process as in claim 2 including also the drying and powdering of the recovered resin.

4. A process as in claim 2 including also the neutralizing, drying, and powdering of the recovered solid.

References Cited in the file of this patent
UNITED STATES PATENTS

| | | |
|---|---|---|
| 478,229 | Frank | July 5, 1892 |
| 757,337 | Nettl | Apr. 12, 1904 |
| 1,160,365 | Baekeland | Nov. 16, 1915 |

(Other references on following page)

UNITED STATES PATENTS

| | | |
|---|---|---|
| 1,933,445 | Murdock | Oct. 31, 1933 |
| 2,077,884 | Howard et al. | Apr. 20, 1937 |
| 2,092,622 | Koch et al. | Sept. 7, 1937 |
| 2,122,124 | Alles | June 28, 1938 |
| 2,167,556 | Smull | July 25, 1939 |
| 2,429,102 | Lewis et al. | Oct. 14, 1946 |
| 2,491,832 | Salveson et al. | Dec. 20, 1949 |
| 2,574,027 | Farber | Nov. 6, 1951 |

FOREIGN PATENTS

| | | |
|---|---|---|
| 983,634 | France | Aug. 8, 1944 |

OTHER REFERENCES

Chem. Abstracts (Kolosov), 41, 1862 (1947).